United States Patent Office 3,099,107
Patented July 30, 1963

3,099,107
WATER CONSERVATION
Floyd Trimble, Oklahoma City, Okla.
(3324 Homewood Drive, Memphis 28, Tenn.)
No Drawing. Filed Mar. 27, 1961, Ser. No. 98,288
7 Claims. (Cl. 47—58)

This invention relates to soil treatment and, more particularly it relates to a process for treating soil with certain synthetic detergents which are products of the condensation of coconut oil with diethanolamine. By treating the soil with such detergents unusual and highly desirable results are attained.

Modern civilization requires enormous amounts of fresh water and as a consequence water shortages are already a problem for many cities. One utility association expects more than 1,000 communities to ration water this year, while another claims 20% of the nation's 18,000 municipal water systems have supplies too skimpy to meet dry-year demands. Shortages in recent years have had diverse results. They have led the residents of one Southwestern city to line up to buy pure water at 50 cents a gallon, inspired an Eastern city ordinance providing a fine for a leaky faucet and induced another Eastern city to assign inspectors to patrol city streets looking for illegal lawnwatering.

Government experts sketch this picture of United States water resources and needs: The nation now has about 515 billion gallons of fresh water "readily available" each day, of which 312 billion are being used. By 1980, daily needs—based on an expected 270 million population—will be 597 billion gallons. The gap between the amount of water available and future requirements will be narrowed somewhat by increased industrial and civic re-use of water. But some new sources, according to these authorities, will be needed if the increased demand is to be met. The problem will continue to be far greater in some areas than it is in others, because the nation's available water resources are not evenly distributed. Some areas have more water than they will need in the foreseeable future; others, such as the arid Southwest and the thickly-populated mid-Atlantic states, face increasingly severe shortages.

Pressure on water resources comes from both homes—which take an average of 150 gallons a day per resident from city systems, up 30 gallons from 1940—and from business, which accounts for nearly 40% of the nation's consumption. Some chemical factories need 17 million gallons annually for each employee on the payroll, while an aluminum plant uses 22 million gallons per man. Turning out a ton of newsprint or rayon may require 240,000 gallons, while 60,000 gallons are needed for a ton of steel.

Various means have been proposed for meeting the present and future water requirements of the nation. These proposals have included both distillation and freezing techniques for the recovery of fresh water from saline waters such as sea water which methods have been only partially successful in alleviating the water problem generally because of the costs involved. Other methods proposed for overcoming our present water shortages have involved what in general are classified as converation methods. These have perhaps been the most successful to date and include the construction of dams to impound the waters of a river or stream, construction of ponds, terrace farming, and the like. Even though the converation of natural water by the methods outlined above have been widely used, the results have not been entirely satisfactory, generally because such methods cannot be relied upon to meet all present water needs and certainly not our future water requirements. As a rule proposed methods for preventing or controlling runoff have been largely limited to the planting of grass and trees and terrace farming. During a hard rain the amount of water lost due to runoff is a considerable portion of the total rainfall, and, of course, that portion is more or less ineffective in supplying the water needs of the individual farmer or householder. Furthermore runoff is the cause of a large amount of soil erosion.

It is recognized that soils have been treated in the past with mixtures of plant nutrients and certain materials as alkanolamines, including mono-, di-, and triethanolamine; as aliphatic diamines including ethylenediamine and diaminoisopropanol; alkyl monoamines including triethylamine; and other so-called "surface-depressing" agents, including sulfonated pine oil, sulfonated naphthenic acids, sulfonated vegetable oils and certain alkyl benzene sulfonates. A certain degree of success has been attained using mixtures of plant nutrients and the various substances listed above in stimulating the growth of plants and at the same time conserving water and reducing soil erosion. Generally, such results have not been entirely satisfactory. One objection is that too large a quantity of the surface active agent must be used to accomplish the desired results. This is objectionable not only because of the costs involved but when such amounts are used great care must be exercised to prevent "burning" of the plant.

It is, therefore, a principal object of the present invention to provide a process for the conservation of water which process obviates the disadvantages of the prior art processes.

It is another object of my invention to provide a process whereby the individual householder can practice water conservation by a procedure which is simple, effective, and economical to operate.

These and other objects and advantages of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises a process involving the application of a synthetic detergent to soil to bring moisture, and incidentally nutrients, to the roots of any vegetation growing in the soil, thereby to increase the rate of growth of such vegetation, to increase the rate and extent of water penetration into the soil, to increase the water retention properties of the soil; and to reduce soil erosion caused by heavy rains. For best results the detergent should be applied immediately before watering or a rain; however, good results are attained if the detergent is applied during the watering period.

Before proceeding with specific examples illustrating my invention, it may be well to indicate in general the nature of the materials and conditions required in the process.

As pointed out about the synthetic detergents that may be employed in the process of my invention are products of the condensation of coconut oil with diethanolamine. More specifically one of these products is a coconut fatty acid amine condensate modified with diethanolamine oleate. The formula of the lauric amide, which forms the major portion of the compound is

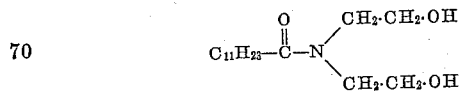

and the modifying oleate is

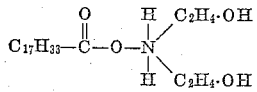

This particular detergent is completely soluble in water and various organic solvents, is a light amber, viscous liquid having an average molecular weight of 331. It is available commercially under the trade designation Solar Regular Liquid Concentrate.

Another specific detergent that is particularly effective in the process of my invention is a combination of coconut oil fatty acid amine condensate and a special type amine sulfonate. This product is available under the trade designation Solar 25 Liquid Concentrate. Its physical properties are as follows: Pale yellow, viscous liquid; specific gravity 25/25=1.045; and it is completely soluble in water and various organic solvents. It is described further in U.S. Patent 2,599,391.

The novel and unexpected results obtained using either of the two synthetic detergents listed above are believed to be due to the capability of these two compounds to reduce the surface tension of water greatly even when used in very small quantities. This property will be apparent from the data summarized in Tables 1 and 2 below. For comparison purposes the surface tension of water containing varying amounts of sodium dodecylbenzene sulfonate is given in Table 3. Of all the surface active agents heretofore used for this purpose, sodium dodecylbenzene sulfonate was by far the best.

TABLE 1

| Concentration of Solar Regular Liquid Concentrate, Weight Percent in Distilled Water at 25° C. | Surface Tension, Dynes/cm. |
|---|---|
| 0.1 | 29.0 |
| 0.05 | 30.00 |
| 0.01 | 30.00 |
| 0.005 | 30.5 |
| 0.001 | 31.5 |
| 0.0005 | 35.0 |

TABLE 2

| Concentration of Solar 25 Liquid Concentrate, Weight Percent in Distilled Water at 25° C. | Surface Tension, Dynes/cm. |
|---|---|
| .10 | 34.5 |
| 0.05 | 34.6 |
| 0.01 | 29.2 |
| 0.001 | 40.0 |
| 0.0004 | 57.8 |

TABLE 3

| Concentration of Sodium Dodecylbenzene Sulfonate, Weight Percent in Distilled Water at 25° C. | Surface Tension, Dynes/cm. |
|---|---|
| 0.10 | 33.5 |
| 0.05 | 41.0 |
| 0.025 | 42.5 |
| 0.01 | 48.0 |

The data of Table 1 show that one-half pound of Solar Regular Concentrate will reduce the surface tension of 100,000 pounds of water to 35 dynes per centimeter. On the other hand the data of Table 3 show that about 200 times that quantity of sodium dodecylbenzene sulfonate would be required to reduce the surface tension of the same quantity of water to approximately the same value. Table 2 shows that about one pound of Solar 25 Liquid Concentrate would reduce the surface tension of 100,000 pounds of water by the same value.

As to the amount of either of the detergents to use that may vary from 0.0004 percent to about 0.01 percent based upon the amount of water. Greater quantities of these detergents may, of course, be used without any detrimental effects whatever. This is true because these detergents appear to act as a nutrient for plants and concentrations as high as a few percent based on the amount of water exhibit no "burning" effect on the plants.

Based upon soil area the amounts of either of these two detergents (Solar Regular Liquid Concentrate and Solar 25 Liquid Concentrate) may vary from about 0.075 to 0.50 pound per acre. Preferably the amount may vary from about 0.15 to 0.30 pound per acre. It should be understood, however, that greater quantities may be used without detrimental effects. Greater quantities increase costs with no corresponding increase in in benefits.

In order to disclose the nature of the present invention still more clearly, the following illustrative examples will be given. It is to be understood that the invention is not to be limited to the specific conditions or details set forth in the examples except insofar as such limitations are specified in the appended claims.

*Example 1*

Just before rain was forecasted by the Weather Bureau four lawn areas of 10,000 square feet each were sprayed with an aqueous solution containing 0.01 percent weight of Solar Regular Liquid Concentrate as follows:

| Area No.: | Ounces of Solar Regular Liquid Concentrate used on area |
|---|---|
| 1 | 0.5 |
| 2 | 1.0 |
| 3 | 2.0 |
| 4 | 3.0 |

Following the application of the detergent to the lawn approximately one-half inch of rain fell over a period of about one hour. At the end of a two weeks' period during which time no additional rain fell each of the treated areas and a similar area which was untreated as a control were compared as to greeness of the grass in each.

| Area No.: | Condition of grass |
|---|---|
| Control | Brown |
| 1 | Green with brown spots |
| 2 | Green |
| 3 | Green |
| 4 | Green |

*Example 2*

The procedure of Example 1 was repeated in which Solar 25 Liquid Concentrate was substituted for the Solar Regular Liquid Concentrate of Example 1. The results obtained were very similar to those obtained in Example 1.

*Example 3*

In this example the procedure of Example 1 was repeated with the exception that sodium dodecylbenzene sulfonate was substituted for the Solar Regular Liquid Concentrate used in Example 1. The results obtained were as follows:

| Area No.: | Condition of grass |
|---|---|
| Control | Brown |
| 1 | Brown |
| 2 | Brown |
| 3 | Brown |
| 4 | Brown |

*Example 4*

Eight fruit trees, including an apricot tree, three peach trees, a plum tree, and three apple trees all gave forth new growth averaging more than one inch in length within 48 hours following one treatment with water containing 0.0005 percent by weight of Solar Regular Liquid Concentrate. Two trees, watered with an equal quantity of water containing none of the detergent, gave no new growth during the test period.

*Example 5*

The procedure of Example 4 was repeated except an equal quantity of Solar 25 Liquid Concentrate was substituted for the Solar Regular Liquid Concentrate used in Example 4. The results were similar to those obtained in Example 4.

*Example 6*

The procedure of Example 4 was repeated with the modification that an equal amount of sodium dodecylbenzene sulfonate was substituted for the Solar Regular Liquid Concentrate used in Example 4. The results were negative in that the trees watered with water containing 0.0005 percent weight percent of sodium dodecylbenzene sulfonate gave no new growth during the test period.

*Example 7*

In this example tests were made to compare the amount of water penetration for untreated soil and for identical soil treated with the Solar Regular Liquid Concentrate in an amount equal to 0.125 pound per acre. A vertically maintained glass tube 3½ inches in diameter was provided at its lower end with a wire screen of sufficiently fine mesh so that soil may be retained therein. Soil, in this example, sandy loam, having a free moisture content of 12. percent by weight was packed into the tube to a height of 10 inches and to a density of 1.3 grams per milliliter. The upper surface of the soil sample was so formed as to possess a slope 0.25 vertical inches per horizontal foot. An atomizer was provided above the soil surface for spraying water thereon at a desired rate, in this case 3.50 inches per hour. A side tube or arm was formed in the vertical tube adjacent the lowest point of the soil surface, whereby water running off the soil without penetrating it could be collected and subsequently measured. The above apparatus simulates a 10 inch layer of soil overlying a highly porous subsoil.

The amount of water penetrating the soil for various amounts of water sprayed thereon (referred to as rainfall) was determined by measuring the amount of water passing out of the side arm and subtracting that volume from the volume of rainfall. The tube was repacked with fresh soil; the Solar Regular Liquid Concentrate was applied to the surface in an amount of 0.125 pound per acre; and the penetration determinations repeated.

Referring to the untreated soil it was found that the initial water which fell on the dry soil was completely absorbed. After the soil surface became wetted, only a part of the water was absorbed, the remainder running off the surface. As additional water was applied, the amount absorbed gradually decreased until the soil was wetted throughout its entire depth at which time only 28.5 percent of the water being applied was absorbed. The proportion of water absorbed remained the same during further spraying of water on the soil. In the case of the treated soil even after the surface was wetted the soil continued for some time to absorb all the water. When the entire depth of the soil was wetted, 95.1 percent of the water added to the surface thereafter continued to be absorbed.

It is thus seen that once the soil is fully wetted, water will continue to be absorbed at a constant rate as long as the water which penetrates the soil can flow through a porous subsoil, and in the present case such rate for soil treated in accordance with the present invention was 3.33 times that for the untreated soil. When such process is applied to a large area on a commercial scale, as a result of the diminished water flow across the surface of the soil, soil erosion, if it exists, may be greatly reduced or substantially eliminated.

*Example 8*

The procedure of Example 7 was repeated with the modification 0.25 pound per acre of Solar 25 Liquid Concentrate was substituted for the 0.125 pound per acre of Solar Regular Liquid Concentrate used in Example 7. The results obtained were similar to those obtained in Example 7.

*Example 9*

In this experiment the procedure of Example 7 was repeated except 0.25 pound per acre of sodium dodecylbenzene sulfonate was used instead of 0.125 pound of Solar Regular Liquid Concentrate. The results were negative in that the rates of water absorption of the treated and untreated soils were equal.

*Example 10*

In this example, the relationship between water penetration after complete wetting of the soil and rate of water application to the soil (simulated rainfall) for both the untreated and treated sandy loam soil is illustrated. By the procedure of Example 7 constant water penetrations, which are reached after complete wetting of soil, were determined for varying water flow (rainfall) rates in the case of untreated soil. This was repeated for soil treated with 0.125 pound per acre of Solar Regular Liquid Concentrate.

It was found that in the case of untreated soil at very low rates of rainfall all the water penetrates the soil, but as the rate of water application increases, water absorption rapidly decreases. In contrast thereto, where the soil is treated with the Solar Regular Liquid Concentrate all water applied to the surface is absorbed up to a rate of 3.2 inches of water per hour. For higher rates of rainfall, treated soil absorbed about 3.8 times that of untreated soil. Thus, the process of the present invention is particularly applicable to arid areas experiencing little rainfall but where rain falls at abnormal rates when it does occur, since the soil will absorb and retain a much greater amount of the scarce water than if untreated.

*Examples 11 and 12*

In these examples 0.25 pound per acre of Solar 25 Liquid Concentrate and 0.25 pound per acre of sodium dodecylbenzene sulfonate respectively were substituted for the 0.125 pound per acre of Solar Regular Liquid Concentrate used in Example 10. The results obtained using the Solar 25 Liquid Concentrate were similar to those obtained when Solar Regular Liquid Concentrate was used. On the other hand the soil treated with the sulfonate exhibited no greater water absorption rate than untreated soil.

Additional experiments disclosed that the water penetration of other types of soils is greatly enhanced by the treatment of those soils with either Solar Regular Liquid Concentrate or Solar 25 Liquid Concentrate in the amounts specified in Examples 10 and 11. Other types of soils tested included high clay and clay loam soils.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A process for treating soil to enhance the water penetration and retention characteristics thereof and to stimulate the growth of vegetation which comprises applying to said soil a detergent, said detergent defined as a coconut fatty acid amine modified with diethanolamine oleate and having an average molecular weight of 331 in an amount varying from 0.075 to 0.50 pound per acre.

2. A process for treating soil to enhance the water penetration and retention characteristics thereof and to stimulate the growth of vegetation which comprises applying to said soil a detergent, said detergent defined as a coconut fatty acid amine modified with diethanolamine oleate and having an average molecular weight of 331 in an amount varying from 0.15 to 0.30 pound per acre.

3. A process for treating soil to enhance the water penetration and retention characteristics thereof and to stimulate growth of vegetation which comprises contacting the soil with water containing from 0.0004 to 0.01 percent of a detergent, said detergent defined as a coconut fatty acid amine modified with diethanolamine oleate and having an average molecular weight of 331.

4. A process for treating soil to enhance the water penetration and retention characteristics thereof and to stimulate the growth of vegetation which comprises applying to said soil a detergent, said detergent defined as a coconut fatty acid amine formed by condensing coconut oil with diethanolamine in an amount varying from 0.075 to 0.50 pound per acre.

5. A process for treating soil to enhance the water penetration and retention characteristics thereof and to stimulate the growth of vegetation which comprises applying to said soil a detergent, said detergent defined as a coconut fatty acid amine modified with an amine dodecyl sulfonate, said detergent having a specific gravity at 25/25 of about 1.045, in an amount varying from 0.075 to 0.50 pound per acre.

6. A process for treating soil to enhance the water penetration and retention characteristics thereof and to stimulate the growth of vegetation which comprises applying to said soil a detergent, said detergent defined as a coconut fatty acid amine modified with an amine dodecyl sulfonate, said detergent having a specific gravity at 25/25 of about 1.045, in an amount varying from 0.15 to 0.30 pound per acre.

7. A process for treating soil to enhance the water penetration and retention characteristics thereof and to stimulate the growth of vegetation which comprises applying to said soil water containing from 0.0004 to 0.01 percent of a detergent defined as a coconut fatty acid amine modified with an amine dodecyl sulfonate, said detergent having a specific gravity of about 1.045 at 25/25.

References Cited in the file of this patent

UNITED STATES PATENTS

| | | |
|---|---|---|
| 2,531,190 | Ackelsberg | Nov. 21, 1950 |
| 2,599,391 | Katzman | June 3, 1952 |
| 2,689,173 | Clarke | Sept. 14, 1954 |
| 2,806,027 | Steward | Sept. 10, 1957 |
| 2,860,448 | Carasso | Nov. 18, 1958 |
| 2,867,944 | Fletcher | Jan. 13, 1959 |
| 2,946,155 | Barnhill | July 26, 1960 |

OTHER REFERENCES

Condensed Chemical Dictionary, fifth edition, N.Y. Reinhold, 1956. Pages 372, 373, 801. QD 5. C5 (1956).